United States Patent [19]
DeBons et al.

[11] Patent Number: 4,548,721

[45] Date of Patent: Oct. 22, 1985

[54] METHOD OF ENHANCED OIL RECOVERY AND COMPOSITIONS USEFUL THEREIN

[75] Inventors: Francis E. DeBons, Richmond; Lawrence E. Whittington, Katy, both of Tex.; Larry D. Pedersen, Canal Winchester, Ohio

[73] Assignees: Getty Oil Company, Houston, Tex.; Reed Lignin, Inc., Greenwich, Conn.

[21] Appl. No.: 577,370

[22] Filed: Feb. 6, 1984

Related U.S. Application Data

[63] Continuation-in-part of Ser. No. 437,185, Oct. 27, 1982, abandoned.

[51] Int. Cl.⁴ ............................................. E21B 43/22
[52] U.S. Cl. ............................... 252/8.55 D; 166/274; 166/275
[58] Field of Search .................... 252/8.55 D, 8.5 M; 166/274, 275

[56] References Cited

U.S. PATENT DOCUMENTS

| | | | |
|---|---|---|---|
| 1,823,440 | 9/1931 | DeGroote et al. | 252/8.55 |
| 3,307,628 | 3/1967 | Sena | 252/8.55 X |
| 3,348,611 | 10/1967 | Reisberg | 166/275 |
| 3,425,953 | 2/1969 | Cowan et al. | 252/363.5 |
| 3,438,960 | 4/1969 | Kim | 252/8.5 X |
| 3,492,228 | 1/1970 | Kim | 252/8.5 |
| 3,504,744 | 4/1970 | Davis et al. | 166/252 |
| 3,538,071 | 11/1970 | Kim | 252/8.5 X |
| 4,006,779 | 2/1977 | Kalfoglou | 166/275 |
| 4,133,385 | 1/1979 | Kalfoglou | 166/273 |

OTHER PUBLICATIONS

Bansal et al., *The Canadian Journal of Chemical Engineering*, vol. 57, Apr. 1979, pp. 203–210.
Neale et al., *Can. J. Chem.*, vol. 59, 1981, pp. 1938–1943.
Chiwetelu et al., *The Journal of Canadian Petroleum Technology*, 1980, pp. 91–99.

*Primary Examiner*—Herbert B. Guynn
*Attorney, Agent, or Firm*—Arnold, White & Durkee

[57] ABSTRACT

A method for the enhanced recovery of oil comprised of injecting into an oil containing formation a surfactant system comprised of an oil soluble amine modified lignin and an anionic or nonionic surfactant; driving the surfactant system through the formation and producing the oil mobilized by the surfactant system. A surfactant composition useful for enhanced oil recovery methods comprised of an oil soluble amine modified lignin and an anionic or nonionic surfactant.

26 Claims, No Drawings

METHOD OF ENHANCED OIL RECOVERY AND COMPOSITIONS USEFUL THEREIN

CROSS REFERENCE TO RELATED APPLICATION

This application is a continuation-in-part of U.S. patent application Ser. No. 437,185 filed Oct. 27, 1982, now abandoned.

FIELD OF INVENTION

This invention concerns an enhanced oil recovery process which utilizes a combination of surfactants. More particularly, this invention is directed to an enhanced oil recovery process using a surfactant system including, as one component, an oil soluble amine modified lignin. The invention is also directed to compositions useful in enhanced oil recovery methods.

BACKGROUND OF THE INVENTION

Petroleum is produced from subterranean formations through wells penetrating the formation. Initially natural reservoir pressure may be sufficient to cause the oil to flow to the surface. As natural reservoir pressure declines due to production from the reservoir, various forms of artificial lift may be employed to bring to the surface the oil which flows into the well bores. This phase of production is usually termed primary.

Typically, during the primary production period of a reservoir only 10 to 30% of the oil initially in place may be economicaly recovered. As the production rate from a reservoir falls near the level at which it is no longer economic to operate the field, active steps, usually termed secondary, are taken to increase recovery. In some instances, secondary recovery techniques may be employed from the time of initial production from a reservoir to optimize recovery.

The most common form of secondary recovery is the process known as waterflooding. In a waterflood project, water in injected into the oil producing formation through injection wells, repressurizing the formation and sweeping oil which would not have otherwise been produced into production wells. Such a procedure will usually allow the economic production of an additional 10 to 30% of the oil originally in place.

As is readily seen, a reservoir may have as much as 80% of the original oil in place still unproduced after primary and secondary operations have terminated. The increasing scarcity of crude oil and its rising price have led to the development of various techniques intended to allow further production from reservoirs which have been depleted by primary and secondary operations. These operations aimed at enhanced oil recovery from conventionally depleted reservoirs are generally termed tertiary.

Among the most promising of tertiary recovery methods are processes wherein a solution of surfactants is injected into the reservoir. The surfactant solution mobilizes the oil remaining in place after conventional production and allows it to be swept into production wells.

To date most enhanced oil recovery surfactant systems have used a petroleum sulfonate or a blend of two or more petroleum sulfonates. Typically, the average equivalent weight of a petroleum sulfonate or the blend of petroleum sulfonates useful in enhanced oil recovery operations is about 400. A common technique is to use a blend of a water soluble petroleum sulfonate and an oil soluble petroleum sulfonate. The correct combination of the two petroleum sulfonates yields a stable micellar solution which lowers the interfacial tension between the crude oil and surfactant solution and is capable of mobilizing the residual oil in the formation. This form of chemical or surfactant flooding is called low tension flooding.

Another form of chemical or surfactant flooding utilizing petroleum sulfonates employs a phase partitioning surfactant system. Such a system operates through the formation of a middle phase microemulsion comprised of both the surfactant and crude oil. Phase partitioning surfactant systems generally require higher surfactant concentration than low tension systems and a cosolvent such as a $C_4$ to $C_6$ alcohol.

Still another form of chemical flooding utilizes so called oil soluble surfactant systems. Such systems are well known and are typified by Marathon Oil Company's MARAFLOOD ® and Union Oil Company's soluble oil process.

A combination of increased interest in enhanced oil recovery due to decreasing crude oil supplies and the scarcity and escalating cost of surfactants has generated research into non-conventional surfactants. Among such surfactants, derivatives of lignin, a phenylpropane polymer which comprises about 17 to 30% of wood, have attracted the attention of researchers for a number of years. As early as 1931, U.S. Pat. No. 1,823,440 issued disclosing a method of enhanced oil recovery involving the use of wood sulfite liquor. More recently, lignin sulfonates have been disclosed as sacrificial agents used to inhibit the deposition of the more costly petroleum sulfonates on the formation. See e.g., U.S. Pat. No. 4,006,779. The present invention allows a significant portion of the expensive petroleum sulfonate in a chemical flood to be replaced with an inexpensive non-petroleum based surfactant while still retaining comparable oil recovery efficiency.

SUMMARY OF THE INVENTION

The instant invention is directed to a method and to compositions useful for the enhanced recovery of oil from a subterranean formation having at least one injection well and at least one production well. A surfactant system comprised of an oil soluble amine modified lignin and a nonionic or anionic surfactant is injected into the producing formation. The surfactant system is then driven through the formation toward the producing well. The oil mobilized by the advancing surfactant system is produced through the production well.

DETAILED DESCRIPTION

The instant invention utilizing surfactants derived from lignins allows enhanced oil recovery operations to be carried out with comparable oil recovery efficiency to state of the art chemical floods utilizing petroleum sulfonates. The advantages of the invention are realized in the lower cost and more abundant supply of the non-petroleum based lignin surfactants utilized in the injected surfactant solution.

The surfactants used in the method of the instant invention are modified derivatives of lignin. In general lignin is a complex phenolic polyether containing many different functional groups including carboxyls, carbonyls and alcoholic and phenolic hydroxyls. Lignins are naturally occurring in wood and are by-products of the pulping industry.

The literature describes two broad classes of lignins. The first, Kraft or alkali lignins, are obtained by cooking wood chips in a caustic solution of sodium sulfide. The alkali lignins may be recovered by lowering the pH of the solution so as to precipitate the alkali lignins. These unsulfonated lignins are commercially available products. It is also possible to sulfonate these alkali lignins. Sulfonated alkali lignins are available commercially from various suppliers. Lignosulfonates, also known as sulfite lignins, comprise the second class. These compounds are generally prepared by cooking wood chips under pressure in a solution of sulfurous acid and sodium bisulfite. Various salts of lignosulfonates as well as the lignosulfonic acids are commercially available. As the surfactants used in the method of the present invention may be prepared from alkali lignins, sulfonated alkali lignins, and lignosulfonates, for the purposes of this description and in the claims, these various classes of compounds will be referred to collectively as lignins.

The lignins just described are all characterized by having little or no oil solubility. Test results have shown these lignins to be ineffective when used as surfactants in enhanced oil recovery processes. The present inventors have found that by modifying the lignins with amines, it is possible to produce oil soluble derivatives thereof which, when used in conjunction with a water soluble surfactant, produce comparable results in efficiency of enhanced oil recovery to that achievable using a conventional surfactant solution of the more costly petroleum sulfonates.

Synthesis of Amine Modified Lignins

The lignin based surfactants used in the method of the present invention are the reaction products of lignins with amines.

The lignins which may be used in their preparation include raw spent sulfite lignin liquors neutralized with sodium, magnesium, calcium, ammonium, or other cations. These sulfite liquors can be derived from hard or soft woods or from other sources. They may have undergone further processing to remove sugars and other carbohydrates either chemically or by fermentation. Further processing to reduce the molecular weight or desulfonate these lignosulfonates can be utilized prior to their modification. For example, the products obtained by cooking a lignin solution with sulfite ion in an alkaline medium at 100° to 220° C. for ¼ to 48 hours make suitable starting products for the instant invention. Lignins derived from soda and sulfate cooking processes are also suitable for the preparation of these surfactants.

The oil soluble amine modified lignins are usually synthesized from readily available alkali lignins, sulfonated alkali lignins or lignosulfonates. However, they may also be synthesized from other, less readily available, lignins. Amine modified lignins which are oil soluble and useful in enhanced oil recovery may be prepared from low molecular weight lignins and lignosulfonates, from further modified low molecular weight lignins, from chemically modified lignosulfonate feedstocks and from modified alkali lignins. The modifications may include a wide variety of chemical reactions including oxidation, sulfonation, sulfonmethylation, carboxylation, alkoxylation, methylolation, phenolation. For example, oil soluble amine modified lignins have been prepared from alkaline and alkaline sulfite cooked low molecular weight softwood lignosulfonates plus tallow amine. They have also been prepared from an alkaline cooked low molecular weight softwood lignosulfate, which had been further sulfomethylated with formaldehyde and sodium sulfite before reaction with tallow amine. Another class of lignin feedstock used to prepare an amine modified lignin is ozonized softwood Kraft lignins. Several oil soluble products have been prepared from the oxidized Kraft lignin, which is water soluble at neutral pH, and tallow amine. All such feedstocks and modifications are referred to herein as lignin.

The amines to be used are alkyl or aryl amines having from 6 to 66 carbon atoms. Primary, secondary, tertiary and quaternary amines are all suitable for preparing the surfactants. The preferred amines are primary fatty amines having from 16 to 22 carbon atoms.

The nature of the reaction product formed is not clear. Obviously, amine salts of the carboxyl and/or sulfonic functional groups of the lignin will be formed. In addition, there are some indications of the formation of amides and/or sulfonamides. Due to the complexity of structure and the molecular weight of the starting materials, an exact elucidation of the nature of the reaction products is not possible. Presumably, a mixture of amides, sulfonamides and salts is produced, but the possibility of other reactions taking place should not be ruled out. The reaction products are characterized as being oleophilic as shown by their solubility in organic solvents such as toluene, xylene, benzene, perchloroethylene, chloroform, butanol and amyl alcohol.

There are several methods by which the amine modified lignins may be prepared. The preferred method is to mix the lignin or a solution thereof with the amine and an organic solvent. The solvent used should either boil at about 100° C. at atmospheric pressure or form an azeotrope with water. The reaction mixture is then refluxed with concomitant removal of water. Generally the reflux is continued until the distillation of water ceases. Following completion of the reaction, nonreactive components of the lignin are removed by filtration or centrifugation. Evaporation of the solvent yields the amine modified lignin as a residue.

Other methods of synthesis include intermixing the lignin with a liquid amine. The amine, depending upon its molecular weight, may require heating to raise its temperature above the melting point. The mixture can then be extracted with an organic solvent followed by filtration to remove unreacted lignin. The product may then by recovered by evaporation of the solvent. It is also possible to extract lignin from an aqueous solution into a solution of amine and an organic solvent. Evaporation of the solvent yields the oil soluble surfactant.

The surface active properties of the amine modified lignins can be varied by the amine to lignin ratio or the molecular weight of the amine reactant. Other variables which affect surface active properties include processing times and temperatures. For example, if xylene is used in place of tuluene, more of the lignin is incorporated into the final product, presumably as a result of the higher reflux temperature of the mixture.

SYNTHESIS EXAMPLES

EXAMPLE 1

A mixture of 175 g. of sodium based spent sulfite liquor, Norlig 82 (American Can Company), having a total solid content of 42.9% (W/W), 500 g. of toluene, and 25 g. of tallow amine was refluxed while azeotropically removing water until the point that the distillate no longer contained water. The reaction mixture was cooled and filtered. The toluene solution was then evaporated to yield 41.5 g. of oil soluble amine modified lignin as a residue.

EXAMPLE 2

The procedure of Example 1 was carried out with a mixture of 58 g. of spent sulfite liquor (42.9% total solids) and 25 g. of tall oil amine.

EXAMPLE 3

50 g. of softwood Kraft lignin was mixed with 50 g. of tallow amine at 100° C. for 30 minutes. The mixture was extracted with toluene and the extract filtered. Evaporation of the solvent yielded 96 g. of product as a residue.

EXAMPLE 4

A solution of 10 g. of sodium softwood lignosulfonate and 90 g. of 10% NaCl (aqueous) was extracted with a solution of 10 g. of tallow amine and 90 g. of toluene. The toluene layer was separated and evaporated to yield 11.7 g. of product as a residue.

Use of Amine Modified Lignins in Enhanced Oil Recovery

The amine modified lignins as exemplified above are oil soluble and have proven to be very effective in lowering the oil/water interfacial tension.

The amine modified lignins can be compounded into stable aqueous systems with various water soluble non-ionic or anionic surfactants or into oil soluble systems again with various anionic or non-ionic surfactants. System as used herein is intended to include stable dispersions and emulsions as well as classical solutions. The preferred surfactants for use with the amine modified lignins are petroleum sulfonates as normally used in enhanced oil recovery operations. However, other water soluble surfactants such as synthetic sulfonates and sulfates, alkyl or alkylaryl ethoxysulfates and ethoxylated alcohols, ethoxylated alkylphenols and other nonionic surfactants can also be used. The word surfactant is to be interpreted to include single chemical species and mixtures of several chemical species.

The aqueous blends display a brine tolerance similar to that of conventional surfactant systems typically used in enhanced oil recovery. Table 1 below sets forth the phase stability of two blends of the amine modified lignin of Example 1 with TRS-40, a water soluble petroleum sulfonate having an average equivalent weight of approximately 340 and manufactured by Witco Chemical Company. The brine stability of these blends is nearly identical to those observed for the same concentration blends of TRS-40 and TRS-18, an oil soluble petroleum sulfonate manufactured by Witco Chemical Company having an average equivalent weight of approximately 500. (These blends of TRS-18 and TRS-40 represent a typical low tension surfactant system for use in enhanced oil recovery and comparisons of such systems in this description will be in reference thereto.)

TABLE 1

| Phase Stability of Amine Modified Lignin Blended with TRS-40 | | | | |
|---|---|---|---|---|
| Concentration, Wt. % Active | | Stability** in Brine*** | | |
| AML* | TRS-40 | 20% Brine | 40% Brine | 60% Brine |
| 0.7 | 1.3 | S | S | S |

TABLE 1-continued

| Phase Stability of Amine Modified Lignin Blended with TRS-40 | | | | |
|---|---|---|---|---|
| Concentration, Wt. % Active | | Stability** in Brine*** | | |
| AML* | TRS-40 | 20% Brine | 40% Brine | 60% Brine |
| 0.9 | 1.1 | S | S | U |

*Amine Modified Lignin.
**Stability measured at 24 hours.
***See Table 3 for Brine Composition; brine is blended in indicated percentages with fresh water.
S = stable
U = unstable The interfacial tensions exhibited by these blends versus crude oil are ultra low. Interfacial tensions of less than 100 millidynes/cm are generally required of enhanced oil recovery surfactant systems. Table 2 shows the interfacial tension of three blends of amine modified lignin versus Illinois crude oil with the same brines of Table 1. The amine modified lignin used in this Table was prepared according to the procedure of Example 1 using 5.0 parts Norlig 82 to 1 part tallow amine.

TABLE 2

| Interfacial Tensions of Amine Modified Lignin/TRS-40 | | | | |
|---|---|---|---|---|
| Concentration, Wt. % Active | | Interfacial Tension Millidynes/cm | | |
| AML | TRS-40 | 20% Brine | 40% Brine | 60% Brine |
| 0.7 | 1.3 | 9 | 3 | 1 |
| 0.9 | 1.1 | 17 | 26 | 16 |
| 1.5 | 0.5 | 3000 | * | * |

*Solutions were too dark for IFT measurement.

Enhanced Oil Recovery Using Amine Modified Lignins

In addition to showing brine stability and the ability to lower interfacial tensions, the surfactants perpared as described above demonstrate excellent oil recovery ability in laboratory core floods when blended with a suitable surfactant.

Low Tension Surfactant System

A typical enhanced oil recovery operation utilizing an amine modified lignin would consist of injection of a solution of surfactant into the oil producing formation through injection wells. The system for a low tension chemical flood would normally range from 2 to 4% total surfactant. The ratio of amine modified lignin to water soluble surfactant will range from about 1 to 5 to about 5 to 1. The preferred range in a low tension flood is from about 1 to 3 to about 3 to 1. The exact concentration and ratio of surfactants will depend on several factors including the particular brine and crude oil and the reservoir temperature. Blends for a particular reservoir will be optimized based on the conditions existing in that reservoir.

The volume of surfactant system slug injected is generally from about 0.01 to about 1.0 pore volumes. Again, the exact volume injected will be determined on a case by case determination based on reservoir conditions and concentration of the surfactant solution. Generally the surfactant slug is followed by a solution of a mobility control agent such as a polysaccharide or a partially hydrolyzed polyacrylamide. The polymer solution drives the surfactant slug evenly through the formation. The oil mobilized by the surfactant slug is swept into the production wells where it is recovered.

The beneficial effect of these amine modified lignins on tertiary oil recovery was shown by a series of corefloods. In each of these corefloods a Berea sandstone core was evacuated and saturated with brine. The brine composition is given below in Table 3.

TABLE 3

| Brine Composition | |
|---|---|
| | Concentration, ppm |
| $Na^+$ | 13,000 |
| $Ca^{+2}$ | 340 |
| $Mg^{+2}$ | 300 |
| $Cl^-$ | 19,650 |
| $SO_4^{-2}$ | 2,400 |
| Total Dissolved Solids | 35,000 |

The core was then saturated with Illinois crude oil having a viscosity of 12 centipoise and a density of 0.86 g/ml. The oil saturation was reduced from about 0.68 to 0.38 by waterflooding the core with the same brine. Chemical floods were performed using the surfactant system shown in Table 4. Each system ws blended in 20% brine/80% fresh water, and each contained 0.14% of a partially hydrolyzed polyacrylamide (NalFlo 50, Nalco Chemical Company) as a viscosity enhancer. A surfactant slug equal to 0.25 pore volumes was injected in each coreflood. Each surfactant was followed by a continuous slug of 0.18% NalFlo 50 in fresh water as a mobility control agent. The oil production was generally complete between 0.35 and 1.3 pore volumes of fluid injected.

TABLE 4

| Tertiary Oil Recovery from Berea Sandstone Cores for Various Surfactant Blends | |
|---|---|
| Surfactant | Tertiary Oil Recovery % |
| 2% TRS-40 | 26 |
| 4% Softwood lignosulfonate | 12 |
| 0.9% Softwood lignosulfonate/1.1% TRS-40 | 42 |
| 0.9% AML*/1.1% TRS-40 | 70 |
| 0.9% TRS-18/1.1% TRS-40 | 79 |
| 0.5% AML**/1.5% TRS-40 | 73 |
| 0.43% Softwood lignosulfonate/0.27% Tallow amine/1.3% TRS-40 | (insoluble) |

*Prepared according to Example 1.
**Prepared from low molecular weight lignin derived from Norlig 82.

The data in Table 4 clearly show the benefit of the amine modified lignin when blended with a water soluble surfactant. A surfactant solution composed only of the water soluble petroleum sulfonate TRS-40 is inefficient at recovering oil, showing only a 26% recovery. The unmodified lignosulfonate alone is even less effective. A blend of unmodified lignosulfonate with TRS-40 shows a slightly improved performance. The amine modified lignosulfonate/TRS-40 blend shows a dramatic recovery increase from 26 to 70%. As can be seen, this is nearly as effective as a conventional petroleum sulfonate blend of TRS-18 and TRS-40. An equally effective surfactant substitute was an amine modified low molecular weight lignin (from Norlig 82). As the example shows, a 73% oil recovery was obtained with a lower level of modified lignin. The requirement for a prior chemical synthesis process was shown by the attempt to blend, in the same proportion as the reaction product, a lignosulfonate, the amine and TRS-40 in an aqueous system. This mixture remained unstable and did not resemble the usual stable surfactant system. As a result it could not be tested in the oil recovery experiment.

The five corefloods represented by the surfactant formulations shown in Table 5 demonstrate the utility of several amine modified lignins. All the recoveries in Table 5 compare favorably with the 26% recovery for TRS-40 alone, which is shown in Table 4. Corefloods 1 and 2 show that a given amine modified lignin is active over a range of compositions. A comparison of corefloods 1 and 3 shows that the amine modified lignin can contain a different lignin to amine ratio and still retain its activity. Corefloods 1 and 4 show that the amine modified lignin can be synthesized from a different amine and maintain this activity. Coreflood 5 shows that a different lignin, namely a low molecular weight lignin prepared from Norlig 82, also gives an active formulation in blends with TRS-40.

TABLE 5

| | | Tertiary Recoveries for Various Formulations of AML Products with Petroleum Sulfonates | | | | |
|---|---|---|---|---|---|---|
| Coreflood No. | Starting Lignin | Amine | Lignin:Amine Ratio | AML Product Conc. Wt % | TRS-40 Conc Wt % | Tertiary Oil Recovery % |
| 1 | Norlig 82 | Tallow | 1.66 | 0.7 | 1.3 | 68 |
| 2 | Norlig 82 | Tallow | 1.66 | 0.9 | 1.1 | 70 |
| 3 | Norlig 82 | Tallow | 2.83 | 0.7 | 1.3 | 64 |
| 4 | Norlig 82 | Tall Oil | 1.66 | 0.7 | 1.3 | 77 |
| 5 | Low Molecular weight Norlig 82 | Tallow | 1.81 | 0.5 | 1.5 | 73 |

Phase Partitioning Surfactant System

A second example of the beneficial effects of amine modified lignins on tertiary oil recovery is their use in a phase partitioning surfactant system. As stated earlier, these systems are characterized by the formation of a middle phase microemulsion with crude oil which incorporates both surfactant from the aqueous phase and crude oil. In the case of a phase partitioning chemical flood, the concentration of surfactant will generally be in the range of about 4 to 6%. The ratio of amine modified lignin to water soluble surfactant will be in the same range as that for low tension floods. Generally, phase partitioning surfactant systems include a cosolvent such as an alcohol, amide, ester, ether, aldehyde, ketone, alkyloxylated alcohol, sulfated or sulfonated alkyloxylated alcohols, or sulfated or sulfonated alcohols. Typically the cosolvent will be a $C_3$ to $C_8$ alcohol.

In a coreflood test the amine modified lignin from a reaction of 3:1 Norlig 82: tall oil amine was substituted directly into a surfactant system for the oil soluble petroleum sulfonate TRS-18. In each coreflood a one foot Berea core was evacuated and saturated with Oklahoma brine. See Table 6 for brine composition.

TABLE 6

| Oklahoma Brine Composition | |
|---|---|
| | Concentration, ppm |
| Na | 24,100 |

TABLE 6-continued

| Oklahoma Brine Composition | |
|---|---|
| | Concentration, ppm |
| $Ca^{+2}$ | 1,600 |
| $Mg^{+2}$ | 1,850 |
| Cl | 45,300 |
| $HCO_3-$ | 240 |
| Total Dissolved Solids | 73,100 |

The core was then saturated with Oklahoma crude oil having a viscosity of 13 centipoise at 130° F. and a density of 0.88 g/ml. The oil saturation was reduced from 0.66 to 0.40 by water flooding the core with the same brine. Chemical floods were performed at 130° F. using the surfactant system shown in Table 7. Each system was blended in 1% sodium chloride. The cosolvent utilized was primary amyl alcohol (PMA). The mobility control polymer was N-Hance 330 (Cort, Inc), a partially hydrolyzed polyacrylamide at 1,500 parts per million in 0.5% sodium chloride. Oil production was usually observed between 0.35 and 1.3 pore volumes of fluid injected.

Table 7

| Tertiary Oil Recovery from Berea Sandstone Cores | | | | | |
|---|---|---|---|---|---|
| Surfactant | | | | Pore | Tertiary |
| % TRS-40 | % TRS-18 | % AML | % PMA | Volumes Injected | Oil Recovery, % |
| 1.94 | | 1.52$^a$ | 1.5 | 0.20 | 78 |
| 1.94 | 1.52 | | 1.5 | 0.20 | 82 |

$^a$1.54:1 Norlig 82:tall oil amine

The results shown in Table 7 clearly show the tertiary recovery potential of the amine modified lignin. The tall oil amine-lignin derivative gives a 78% recovery while the petroleum sulfonate blend gives an 82% recovery.

The corefloods show that the amine modified lignin is nearly as effective as the oil soluble petroleum sulfonate, TRS-18, in this phase partitioning Oklahoma surfactant system. This amine modified lignin surfactant system was mixed without any attempts to optimize performance. The amine modified lignin was simply substituted directly for the oil soluble petroleum sulfonate. The results are similar to those obtained with the Illinois low tension surfactant system. The amine modified lignins replace TRS-18 and perform nearly as well as the petroleum sulfonate.

Oil Soluble Surfactant System

In addition to functioning in low tension and in phase partitioning surfactant systems, the amine modified lignins can be effective in so-called oil soluble surfactant systems. In these systems the surfactant is carried by a hydrocarbon solvent or oil. Oil soluble surfactant systems are well known in the field of enhanced oil recovery. The are typified by Marathon Oil Company's MARAFLOOD ® process and Union Oil Company's soluble oil process.

The Union soluble oils (See, U.S. Pat. Nos. 3,537,520 and 3,163,214) generally contain hydrocarbons, surfactant, stabilizers, and water. The surfactant is a usual EOR material such as a petroleum sulfonate or a synthetic sulfonate or sulfate. Stablilizers or cosolvents are typically alcohols or glycol ethers, and the water generally contains salt. Other classes of suitable cosolvents include those discussed above in connection with the phase partitioning system. The surfactant concentration required to obtain phase stability is relatively high, and therefore a low pore volume slug size is required for these systems. The formulas for typical soluble oil systems are shown in Table 8. The sulfonate for such a surfactant system is usually higher equivalent weight than an aqueous surfactant system sulfonate as it must dissolve in oil.

TABLE 8

| Composition of Soluble Oil Surfactant Systems | | |
|---|---|---|
| | Volume % | |
| Component | A | B |
| Crude Oil | 69.3 | 76.0 |
| Sulfonate (MW 500) | 13.1 | 7.0 |
| Sulfonate (MW 340) | 0 | 2.2 |
| Mineral Oil | 6.9 | 5.7 |
| Ethylene Glycol Monobutyl Ether | 6.4 | 1.9 |
| Water | 4.3 | 7.2 |

The amine modified lignins described in the instant invention are particularly suited to use in these surfactant systems. As described herein, the amine modified lignins replace all of the oil soluble petroleum sulfonate from low tension and phase partitioning surfactants. Since soluble oil systems contain a greater fraction of the higher equivalent weight sulfonates, a larger fraction of the surfactant can be replaced by amine modified lignins.

Marathon's MARAFLOOD ® process includes both water external and oil external micellar systems. The oil external microemulsions are similar to the Union systems in that they contain hydrocarbon, sulfonate, cosurfactant and brine. The water external systems contain less oil, but both systems contain relatively high surfactant concentrations. Amine modified lignins are useful in both types of Maraflood systems as replacements for all or part of the oil soluble sulfonate.

General Enhanced Oil Recovery Surfactants

The descriptions contained here of low tension, phase partitioning and oil soluble surfactant systems for enhanced oil recovery are not intended to portray every surfactant system possible. Actually all EOR surfactant systems can be portrayed on a single ternary diagram which has water, oil and surfactant (plus stabilizers) at the apices. The low tension system simply contains a low concentration of surfactant and oil in water. A somewhat higher surfactant concentration with or without oil added can describe an aqueous phase partitioning surfactant system. This higher concentration surfactant which contains more oil than water can lead to a stable oil external or oil continuous surfactant system. The distinctions among the types of systems are not always clearcut, but those skilled in the art generally agree upon the classification of a given system under discussion.

The intent of the instant invention is to teach the use of amine modified lignins in the surfactant system, in place of part of the usual EOR surfactant, regardless of the name of the surfactant system. In other words, oil soluble amine modified lignins have general utility in enhanced oil recovery surfactant systems and should not be thought to be limited to the specific types of surfactant systems discussed here.

The foregoing description has been directed to particular embodiments of the invention for the purposes of illustration and explanation. Those skilled in the art will readily appreciate modifications and changes in the procedures set forth without departing from the scope and spirit of the invention. Applicants' intent is that the following claims be interpreted to embrace all such modifications and variations.

What is claimed is:

1. A method for the enhanced recovery of oil from a subterranean formation containing oil and having at least one production well and at least one injection well comprising:
injecting into said formation a surfactant system comprised of an oil soluble amine modified lignin comprising the reaction product of a water soluble lignin selected from the group consisting of lignosulfonates and alkali lignins and an alkyl or aryl amine having from 6 to 66 carbon atoms, and a surfactant selected from at least one of the classes of anionic and nonionic surfactants, wherein the ratio of said amine modified lignin to said surfactant is from about 1 to 5 to about 5 to 1;
driving said surfactant system through said formation; and
producing the oil mobilized by said surfactant system through said production well.

2. The method of claim 1 wherein said system is aqueous.

3. A method for the enhanced recovery of oil from a subterranean formation containing oil and having at least one production well and at least one injection well comprising:
injecting into said formation an aqueous surfactant system comprised of an oil soluble amine modified lignin comprising the reaction product of a water soluble lignin selected from the group consisting of lignosulfonates and alkali lignins and an alkyl or aryl amine having from 6 to 66 carbon atoms, and a water soluble surfactant selected from at least one of the classes of anionic and nonionic surfactants, wherein the ratio of said amine modified lignin to said surfactant is from about 1 to 5 to about 5 to 1;
driving said surfactant system through said formation; and
producing the oil mobilized by said surfactant system through said production well.

4. The method of claim 3 wherein said amine is primary fatty amine having from 16 to 22 carbon atoms.

5. The method of claim 3 wherein the ratio of said oil soluble amine modified lignin to said water soluble surfactant is from about 1 to 3 to about 3 to 1.

6. The method of claim 3 wherein said water soluble surfactant is anionic.

7. The method of claim 3 wherein said water soluble surfactant is nonionic.

8. The method of claim 6 wherein said anionic surfactant is a petroleum sulfonate.

9. A method for the enhanced recovery of oil from a subterranean formation containing oil and having at least one production well and at least one injection well comprising:
injecting into said formation an aqueous surfactant system having from about 0.5% to about 5.5% of an oil soluble amine modified lignin, comprised of the reaction product of a water soluble lignin selected from the group consisting of lignosulfonates and alkali lignins and an alkyl or aryl amine having from 6 to 66 carbon atoms, and from about 5.5% to about 0.5% of a water soluble surfactant selected from at least one of the classes of anionic or nonionic surfactants;
driving said surfactant system through said formation; and
producing the oil mobilized by said surfactant system through said production well.

10. The method of claim 9 wherein said surfactant is anionic.

11. The method of claim 10 wherein said surfactant is a petroleum sulfonate.

12. The method of claim 11 wherein said amine is a primary fatty amine having from 16 to 22 carbon atoms.

13. A method for the enhanced recovery of oil from a subterranean formation containing oil and having at least one production well and at least one injection well comprising:
injecting into said formation surfactant system man oil carrier comprised of an oil soluble amine modified lignin comprising the reaction product of a water soluble lignin selected from the group consisting of lignosulfonates and alkali lignins and an alkyl or aryl amine having from 6 to 66 carbon atoms, and a surfactant selected from at least one of the classes of anionic and nonionic surfactants, wherein the ratio of said amine modified lignin to said surfactant is from about 1 to 5 to about 5 to 1;
driving said surfactant system through said formation; and
producing the oil mobilized by said surfactant system through said production well.

14. The method of claim 13 wherein the ratio of said oil soluble amine modified lignin to said surfactant is from about 1 to 3 to about 3 to 1.

15. The method of claim 13 wherein said surfactant is nonionic.

16. The method of claim 13 wherein said surfactant system is further comprised of a cosolvent.

17. The method of claim 13 wherein said surfactant is anionic.

18. The method of claim 17 wherein said amine is a primary fatty amine having from 16 to 22 carbon atoms.

19. The method of claim 18 wherein said anionic surfactant is a petroleum sulfonate.

20. A surfactant composition comprised of:
an oil soluble amine modified lignin comprising the reaction product of a water soluble alkali lignin and an alkyl or aryl amine having from 6 to 66 carbon atoms; and
a surfactant selected from at least one of the classes of anionic and nonionic surfactants, wherein said oil soluble amine modified lignin and said surfactant are present in a ratio of about 1 to 5 to about 5 to 1.

21. The composition of claim 20 wherein said amine is a primary fatty amine having from 16 to 22 carbon atoms.

22. The composition of claim 20 wherein the ratio of oil soluble amine modified lignin to said surfactant is from about 1 to 3 to about 3 to 1.

23. A surfactant composition comprised of:
an oil soluble amine modified lignin comprised of the reaction product of a water soluble lignin selected from the group consisting of alkali and oxidized alkali lignins and an alkyl or aryl amine having from 6 to 66 carbon atoms and an anionic surfactant;
wherein said oil soluble amine modified lignin and said anionic surfactant are present in a ratio between about 1 to 5 to about 5 to 1.

24. The composition of claim 23 wherein said surfactant is water soluble.

25. A surfactant composition comprised of:
an oil soluble amine modified lignin comprised of the reaction product of a water soluble lignin selected from the group consisting of alkali and oxidized alkali lignins and a primary fatty amine having from 16 to 22 carbon atoms and
a petroleum sulfonate,
wherein said oil soluble amine modified lignin and said petroleum sulfonate are present in a ratio between about 1 to 3 and about 3 to 1.

26. The composition of claim 25 wherein said petroleum sulfonate is water soluble.